INVENTORS.
GEORGE D. PFAFFMAN &
ROBERT G. ARMSTRONG
BY
Meyer, Tilberry & Body
ATTORNEYS

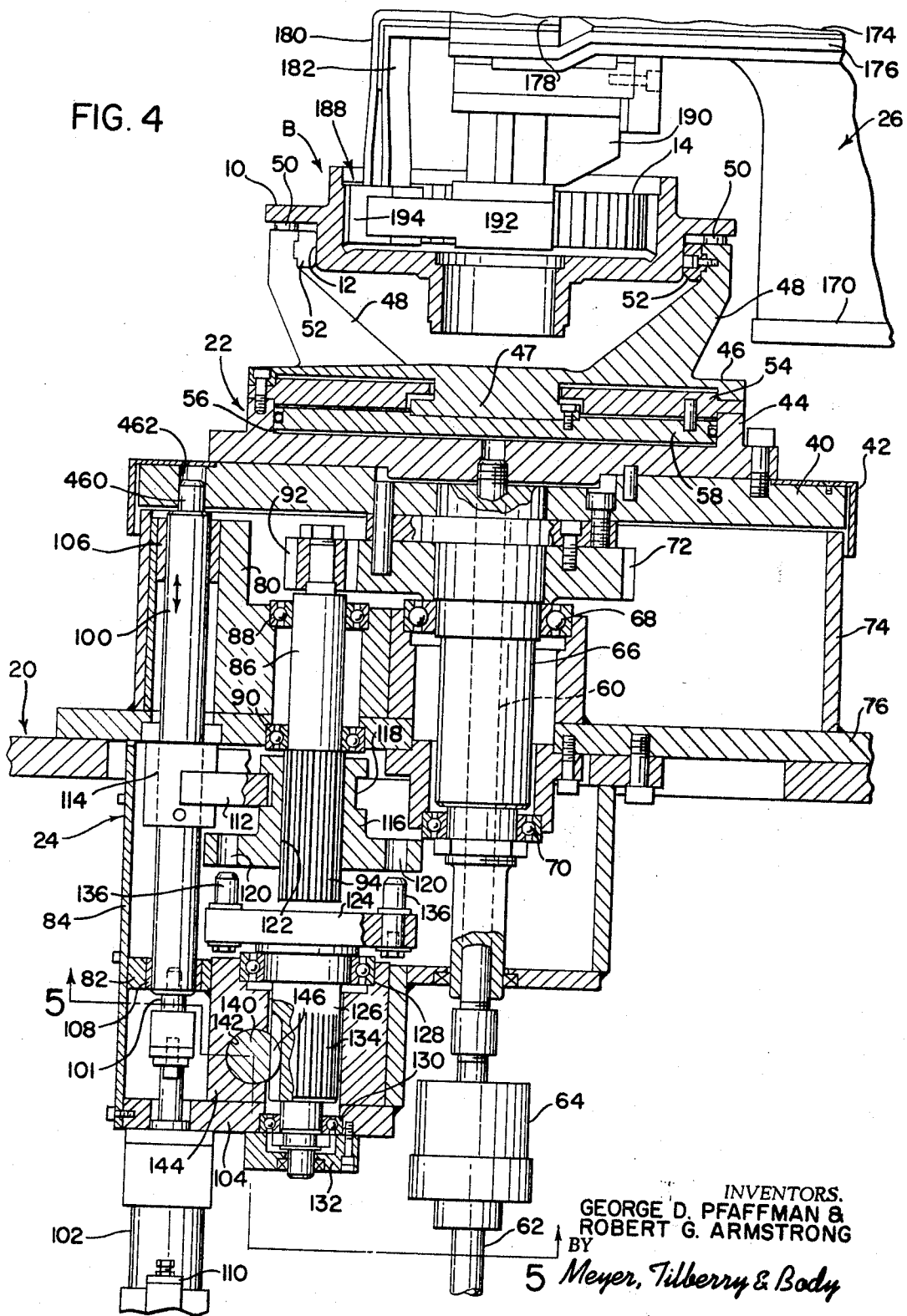

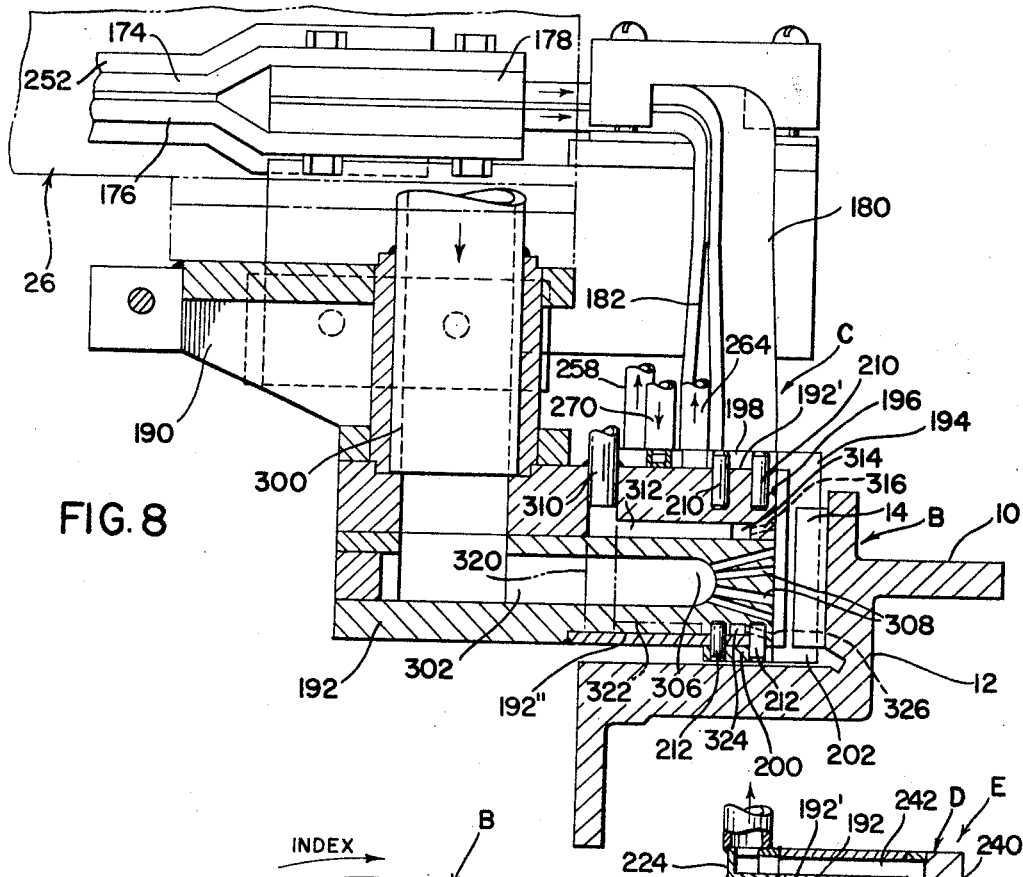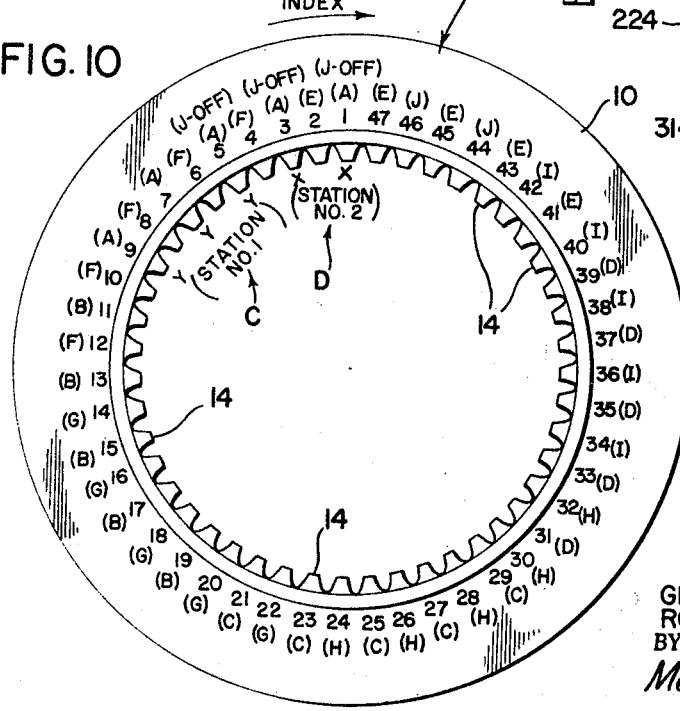

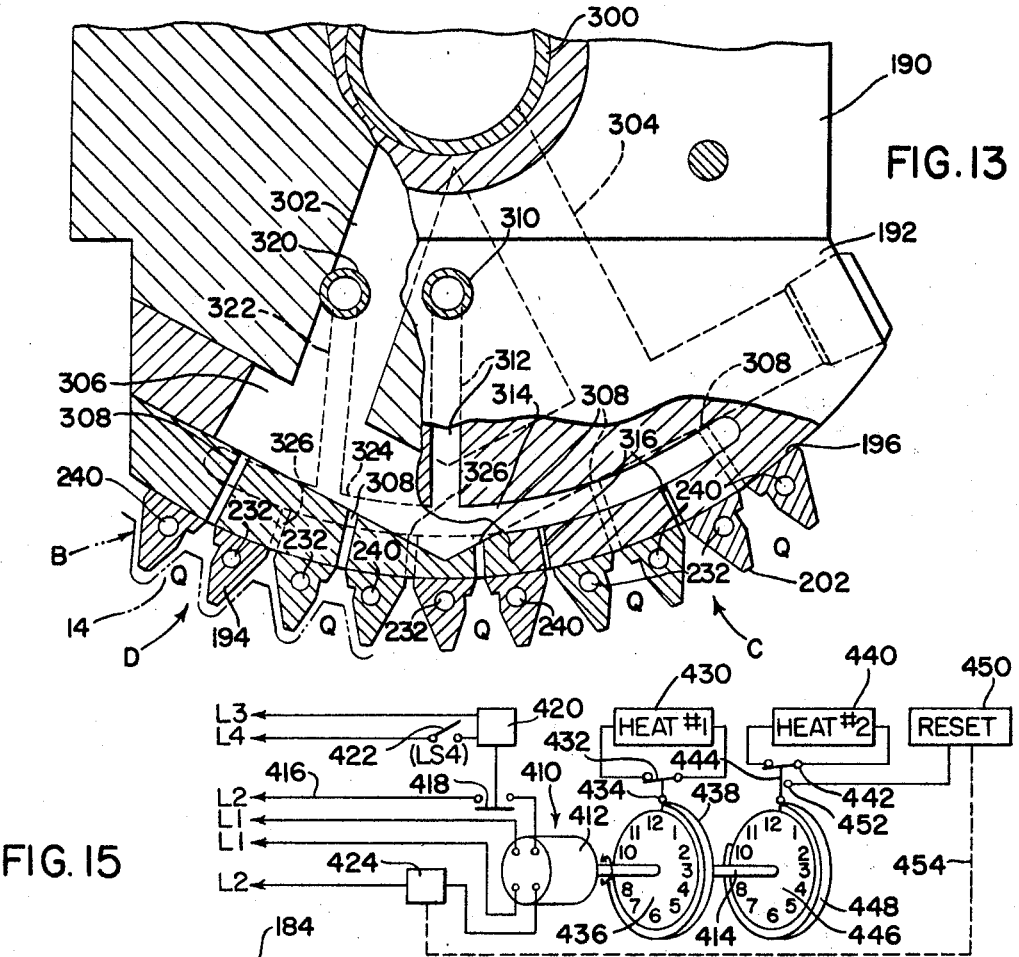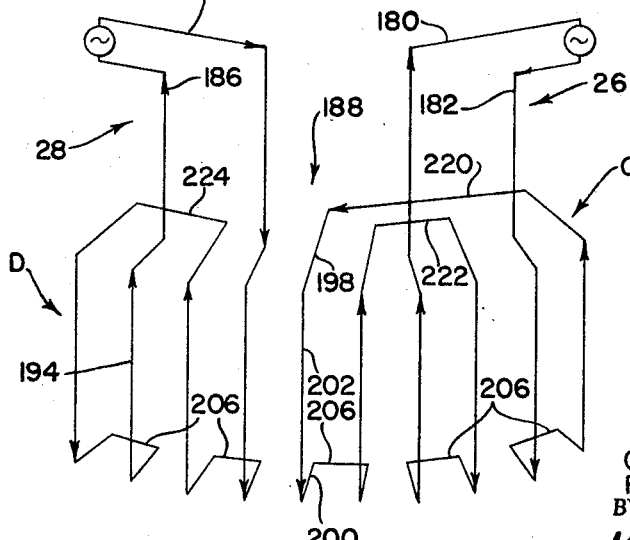

United States Patent Office 3,446,495
Patented May 27, 1969

3,446,495
APPARATUS FOR HARDENING GEAR TEETH
George D. Pfaffman, Farmington, Mich., and Robert G. Armstrong, Chardon, Ohio, assignors to Park-Ohio Industries, Inc., a corporation of Ohio
Filed June 16, 1966, Ser. No. 558,087
Int. Cl. C21d 9/32
U.S. Cl. 266—4
9 Claims The present invention pertains to the art of induction heating, and more particularly to a method and apparatus for hardening gear teeth by first inductively heating the teeth and then quenching them.

This invention is particularly applicable for use in hardening the inner, spaced teeth of a ring gear, and it will be described with particular reference thereto; however, it should be appreciated that the invention has much broader applications and may be used for hardening spaced teeth on the internal or external periphery of a gear. The term "teeth" is used herein to indicate spaced drive members, or similar protruding, reoccurring elements, and this term should not be considered as limiting the invention to any particular type of protruding, reoccurring elements.

In the manufacture of gears, it has become somewhat common practice to harden each tooth of the gear separately by first heating the tooth and then quenching it. The most widely accepted method and apparatus for accomplishing this purpose includes an inductor unit which inductively heats either a tooth, or the facing surfaces of adjacent teeth, and then quenches the heated areas. Although this general procedure is widely used, the cycle time for hardening all teeth on a gear can be relatively long. This is especially true when a large number of teeth must be individually heated and quenched. In addition, as successive adjacent teeth on the periphery of a gear are hardened by prior method and apparatus, there is a tendency for the gear to become distorted. This is due to the progression of the hardened area around the circumference of a gear until all teeth are hardened by rotating the gear only one time. If a number of gear teeth are hardened at one time to decrease the cycle time, the tendency of the gear to become distorted is somewhat accentuated.

The present invention is directed toward an improved method and apparatus for hardening the spaced teeth of a gear whereby a plurality of gear teeth may be simultaneously heated without causing substantial distortion of the gear during the hardening process.

In accordance with the present invention, there is provided an apparatus for hardening the spaced teeth of a gear having teeth arranged in a circle and on the periphery of a gear. This apparatus comprises an inductor means for simultaneously heating a selected number of alternate teeth in an arc sector extending along only a portion of the teeth circle; a quenching unit associated with the inductor means for quenching the heated teeth; means for indexing the gear to bring successive arc sectors along said circle into alignment with the inductor means; control means for causing the indexing means to index the gear a sufficient number of times and distances to heat and quench each of the teeth with a number of indexing times causing at least two revolutions of the gear with the alternate teeth that are unhardened during the first revolution being hardened during a subsequent revolution; means for causing relative movement between the inductor means and the gear in a direction axial of the gear before the gear is indexed to prevent interference between the teeth and inductor means; and, means for moving the inductor means into operative position with respect to the gear teeth after the gear is indexed.

In accordance with another aspect of the present invention, there is provided a method of hardening the spaced teeth of a gear which teeth are arranged in a circle. This method comprises the steps of inductively heating, as a group, a given number of alternate teeth, the group extending along only a portion of the teeth circle; quenching the heated teeth; and, repeating the heating and quenching steps at successive portions around the teeth circle until the circle has been circumscribed at least twice and all teeth have been heated and quenched.

By hardening the spaced teeth of a gear in accordance with the apparatus and method defined above, the inductor means in effect moves twice around the gear and hardens alternate teeth the first time around the gear. The alternate unhardened teeth are hardened the second time around the gear. It is appreciated that in some cases the number of the teeth will require that the inductor means perform the hardening function by, in effect, moving around the gear more than twice. In this case, and in accordance with another aspect of the invention, the inductor means includes at least two independently controlled inductors. One of the inductors may be turned off at the terminal end of the hardening cycle so that while the last group of teeth are being hardened, previously hardened teeth will not be annealed. This aspect of the invention will be described hereinafter in detail.

The term "alternate teeth" means spaced teeth having one or more teeth therebetween.

The primary object of the present invention is the provision of a method and apparatus for hardening gear teeth by using induction heating which method and apparatus limit distortion of the gear and decrease the time for hardening the teeth.

Another object of the present invention is the provision of a method and apparatus for hardening gear teeth by using induction heating which method and apparatus harden a plurality of alternate gear teeth simultaneously and then repeats this process until all teeth are hardened.

Still another object of the present invention is the provision of a method and apparatus for hardening gear teeth by using induction heating which method and apparatus uses an inductor means including at least two separately controlled inductors for heating a plurality of alternate teeth, as a group, with means for de-energizing at least one inductor to change the number of teeth being hardened.

Yet another object of the present invention is the provision of a novel inductor for heating a plurality of gear teeth, as a group, which inductor is easy to assemble and inexpensive to produce.

Still a further object of the present invention is the provision of a novel inductor for heating a plurality of gear teeth, as a group, which inductor is built up from a plurality of separate, somewhat identical sectors.

These and other objects and advantages will become apparent from the following description used to illustrate the preferred embodiment of the invention as read in connection with the accompanying drawings in which:

FIGURE 4 is an enlarged cross-sectional view illustrating another aspect of the preferred embodiment;

FIGURE 8 is an enlarged cross-sectional view taken generally along line 8—8 of FIGURE 6;

FIGURE 9 is an enlarged cross-sectional view illustrating another aspect of the preferred embodiment of the invention;

FIGURE 10 is a top plan view of the gear being operated on by the present invention;

FIGURE 13 is a three plane, cross-sectional view showing the various passageways within the inductor support block used in accordance with the present invention;

FIGURE 14 is a schematic view illustrating the current path through the inductor used in accordance with the present invention; and, FIGURE 15 is a schematic view illustrating the stepping switch used in accordance with the present invention.

Figure 1:
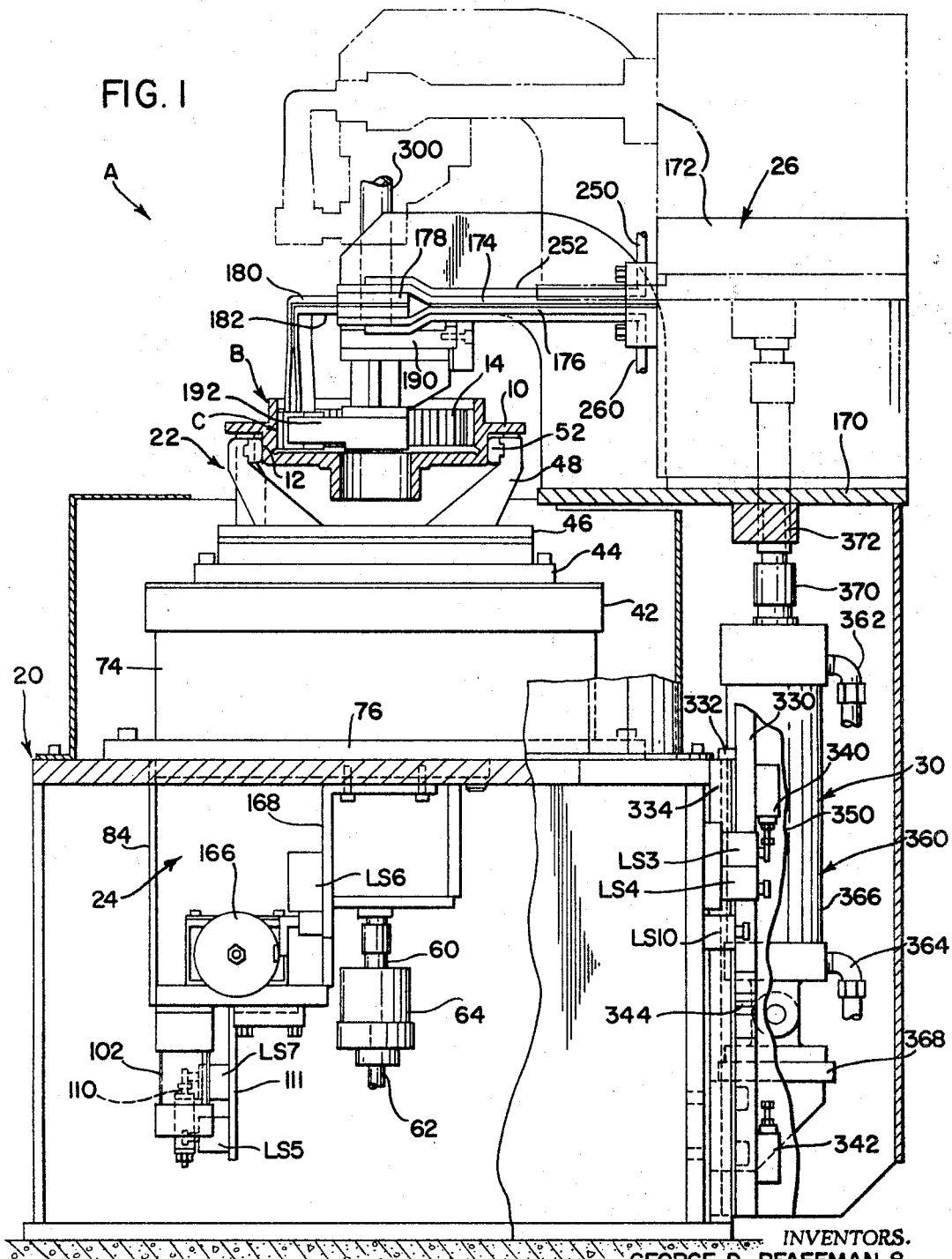
FIGURE 1 is a side elevational view showing somewhat schematically and in cross-section the preferred embodiment of the present invention.
Figure 2:
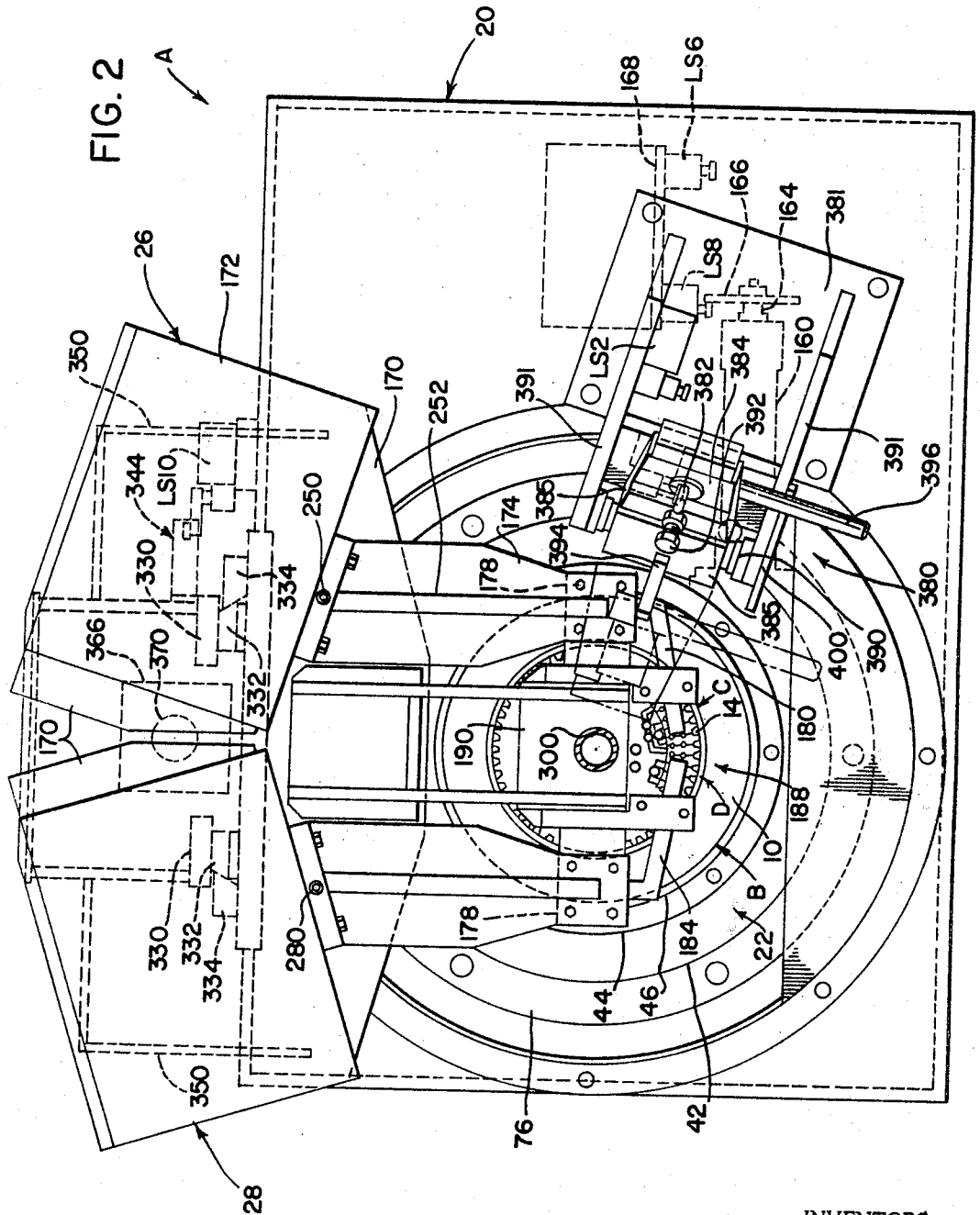
FIGURE 2 is a top plan view illustrating, somewhat schematically, the preferred embodiment of the present invention.

Referring now to the drawings wherein the showings are for the purpose of illustrating a preferred embodiment of the invention only and not for the purpose of limiting same, FIGURES 1 and 2 show an apparatus A for heating the internal, spaced teeth of ring gear B. The gear includes an outer flange 10, a mounting hub 12, and a number of spaced teeth 14 arranged in a circle. Apparatus A includes, primarily, a frame 20, a support table 22, best shown in FIGURE 4, an indexing mechanism 24, best shown in FIGURES 4 and 5, a first heating unit 26, a second heating unit 28, and a heating unit moving mechanism, best shown in FIGURE 1. Hereinafter there is a detailed description of these various elements and their functions with respect to the operation of apparatus A.

SUPPORT TABLE

Referring now more particularly to FIGURE 4, the support table 22 includes a base plate 40 having a dust shield, or cover 42. A bottom plate 44 is secured onto base plate 40 and supports a somewhat flexible top plate 46 having a downwardly extending hub 47. A plurality of spaced, support arms 48 are moved radially upon flexing of plate 46, in a manner to be described later. Each support arm 48 includes a vertically facing boss 50 and a horizontally facing boss 52. These bosses coact with the flange 10 and hub 12 of gear B to locate the gear when the arms 48 are moved inwardly. In order to move the arms, there is provided a partition 54 between plates 44, 46. This partition defines a fluid chamber 56 in which there is provided a piston 58 connected onto the lower portion of hub 47. A fluid line 60 receives pressurized fluid through inlet 62. When pressurized fluid is forced into chamber 56, the arms 48 are extended radially, outwardly; and when the pressure is released, the arms flex radially, inwardly to grip the gear B. It is appreciated that various other arrangements could be provided for clamping the gear with respect to the table 22.

A lower fluid support 64 is secured onto a spindle 66 which is fixedly secured onto base plate 40. The spindle rotates in fluid support 64 and bearings 68, 70. A drive, or indexing, gear 72 is fixedly secured onto the spindle 66 for the purpose of rotating the support table by a mechanism which will be hereinafter described. The spindle and its rotating mechanism are enclosed within a housing 74 which is supported on a lower fixed plate 76.

INDEXING MECHANISM

Referring again to FIGURE 4, the indexing mechanism 24 includes an upper support block 80 and a lower support block 82 which generally define a chamber closed by an access cover 84. Within this chamber, there is provided a counter-shaft 86 journalled within bearings 88, 90. A pinion gear 92 is fixedely secured to the upper end of shaft 86 so that it engages drive gear 72 to impart rotation to the drive gear when the shaft 86 is rotated. The opposite end of shaft 86 is splined for a purpose to be hereinafter explained. A shift rod 100 is reciprocated by a movable rod 101 which is controlled by a fluid cylinder 102 secured onto plate 104 at the lower support block 82. To guide rod 100 during vertical movement, there are provided axially spaced bearings 106, 108 fixedly secured onto support blocks 80, 82, respectively. A switch actuator 110, best shown in FIGURE 1, is movable with rod 101. The actuator 110 is adapted to operate limit switch LS5 when the shift rod 100 is moved downwardly and limit switch LS7 when the rod is moved upwardly. These limit switches are supported on a plate 111.

Shift rod 100 supports a yoke 112 extending from sleeve 114 fixedly secured onto the rod. A first clutch member 116 has a groove 118 adapted to receive the bifurcated ends of yoke 112. At least two holes 120 are spaced around the member 116 for a purpose to be explained later. The clutch member 116 is reciprocally secured onto the splined end 94 of shaft 86 by a splined bore 122. As the rod 100 is reciprocated, the clutch member 116 is moved vertically. A second clutch member 124 is provided below the first clutch member 116. This second clutch member includes a stub shaft 126 journalled within bearings 128, 130. An oil seal 132 prevents unwanted oil leakage around the stub shaft.

Figure 5:
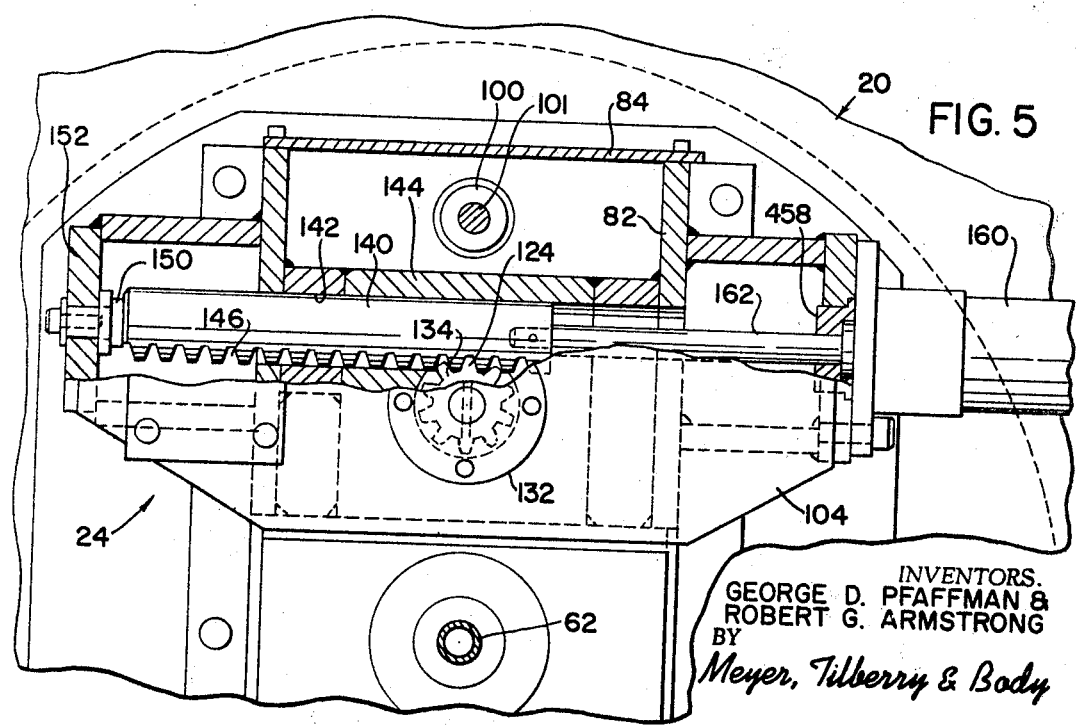
FIGURE 5 is an enlarged cross-sectional view taken generally along line 5—5 of FIGURE 4.
Figure 6:
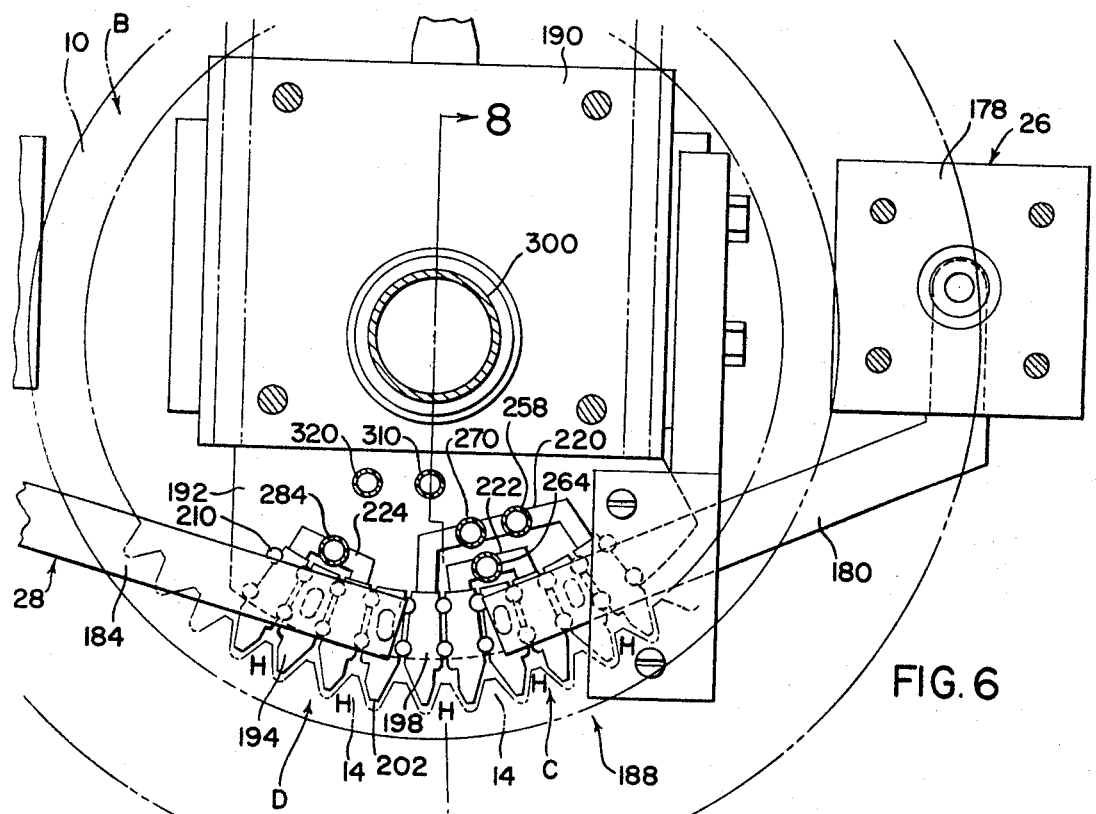
FIGURE 6 is an enlarged top plan view illustrating the inductors used in the preferred embodiment of the invention.
Figure 7:
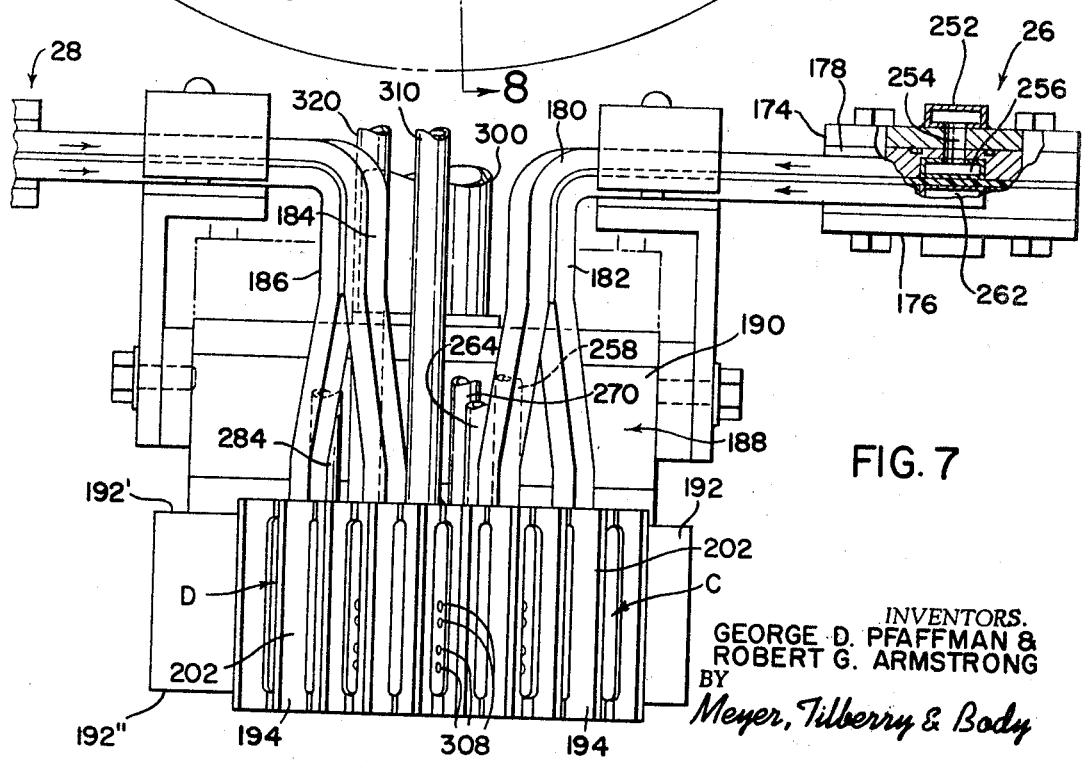
FIGURE 7 is a front elevational view of the inductor shown in FIGURE 6.

Referring now to FIGURES 2, 4 and 5, there is provided, in accordance with the illustrated embodiment of the invention, an indexing rod 140 extending generally perpendicular to stub shaft 126. This rod is reciprocally mounted within bore 142 of housing 144. A rack portion 146, best shown in FIGURE 5, is provided on one side of the rod; and, the outer end of the rod 140 is adapted to abut an adjustable stop 150 supported on plate 152. Referring more particularly to FIGURES 2 and 5, a fluid operated cylinder 160 having a movable rod 162 with a rearward extension 164 is used to move the indexing rod 140. The rack portion 146 engages pinion 134 so that longitudinal movement of the rod rotates the second clutch member 124. A switch plate 166 is secured onto extension 164 so that forward movement of rod 162, and the extension 164, actuates limit switch LS8, and reverse movement of the rod and extension will acuate limit switch LS6.

Movement of the yoke 112 downwardly brings the clutch members 116, 124 into engagement with pins 136 of the second member being received within holes 120 of the first member. When the clutch members are engaged, movement of rod 140 in a reverse direction will rotate a shaft 86 and, thus, the gear B. When the clutch members are disengaged, movement of the rod 140 in a forward direction conditions the mechanism for subsequent indexing. The purpose of this indexing function will be appreciated after the remainder of apparatus A is described.

HEATING UNITS (GENERAL)

Referring to FIGURES 1, 2, 6 and 7, the separately controlled heating units 26, 28 are schematically represented. In accordance with the illustrated embodiment of the invention, the inductor C of unit 26 is adapted to heat three alternate teeth, whereas the inductor D of unit 28 is adapted to heat two alternate teeth. Since the heating units 26, 28 are somewhat identical except for the separate inductors, only unit 26 will be described in detail. This description will apply equally to unit 28. Each unit includes a support plate 170 onto which is mounted a transformer 172. Primary power leads 174, 176, shown in FIGURE 1, are directed to a terminal block 178. Secondary leads 180, 182 of unit 26, extend from the terminal block 178 and are connected to inductor C. In a like manner, secondary power leads 184, 186 extend from terminal block 178 and are connected onto inductor D.

INDUCTOR ASSEMBLY

Figure 11:
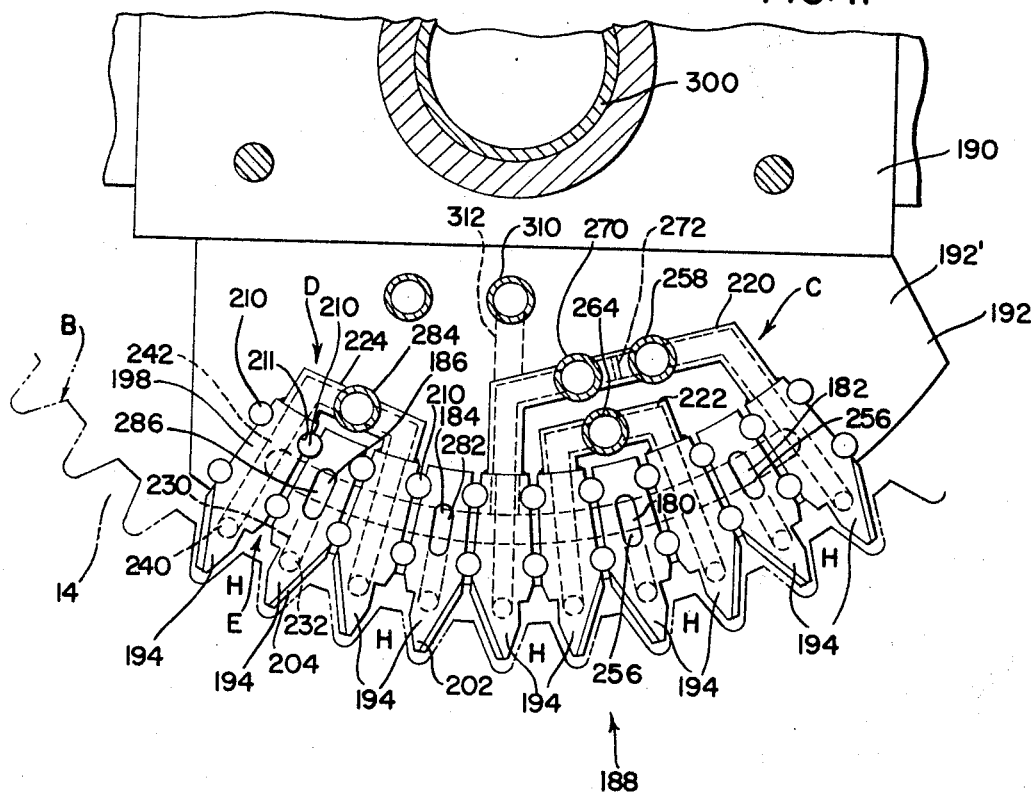
FIGURE 11 is an enlarged top view illustrating the inductor used in accordance with the present invention.
Figure 12:
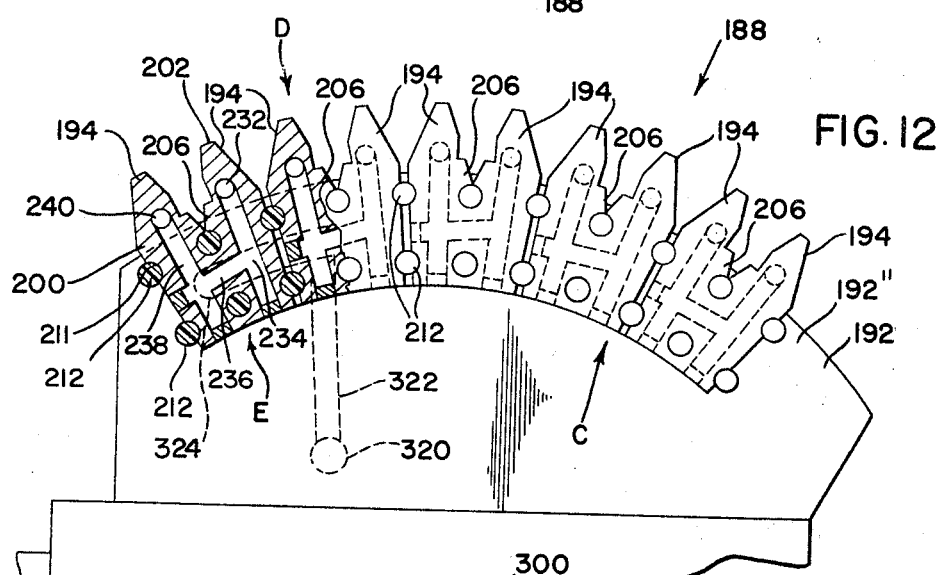
FIGURE 12 is a cross-sectional, bottom view illustrating the inductor shown in FIGURE 11.

The inductor assembly 188 includes inductors C and D which are each supported for movement with the transformers 172 by support frame 190. Referring now to FIGURES 8, 11 and 12, the support frame 190 includes an inductor support block 192 having an upper surface 192' and a lower surface 192". Individual inductor sectors 194 include recesses 196 which allow each sector to be slipped over the support block 192. The recess is defined by legs 198, 200 and a nose 202. Each nose 202 includes a Carbonel E insert 204 on one side. The various sectors 194 are divided into pairs and the lower legs 200 of the two sectors forming a pair are connected at 206, as shown in FIGURE 12. The connecting portion 206 is opposite from the sides of the sectors 194 which include the Carbonel E inserts. As will be explained later, the two sectors forming a pair are adapted to heat one tooth with the tooth extending between the sectors of the pair. The Carbonel E is used to prevent heating of the intermediate gear teeth which are not to be heated.

As shown in FIGURE 11, the various pairs of inductor sectors are joined by connectors 120, 122, and 124. This provides an electrical circuit as shown in FIGURE 14. Current flows from the generators through secondary leads 180, 182, 184 and 186 in a manner indicated by the arrows. As shown in this diagram, the inductor C includes six gear sectors 194 arranged into three pairs whereas the inductor D includes only four gear sectors arranged into two pairs. Current flow is determined by the connectors 220, 222, and 224. By viewing the wiring diagram, it is noted that the current flow in the nose portions 202 of adjacent gear sectors 194 in a particular pair is in opposite directions. This causes a high current flow in the tooth between the sectors of a given pair. The teeth which are positioned between pairs of gear sectors are subjected to current flow on opposite sides which is in the same direction. This current flow causes bucking currents in these teeth and has a tendency to cancel out the current flow in the intermediate teeth so that heating does not take place. It is appreciated that a number of pairs of gear sectors can be varied to change the number of alternate teeth being heated by the various inductors.

In accordance with the present invention, the inductors C and D are independently controlled so that one may be turned off while the other is operative. In this manner, the inductor assembly 188 including both inductors C and D can either heat five alternate gear teeth, three alternate gear teeth, or two alternate gear teeth. Various other combinations of two or more inductors with different number of heated teeth and independently controlled power supplies can be used to change the number of gear teeth which may be heated by de-energizing certain specific inductors. The inductor sectors 194 are held onto the insulated block 192 by upper insulating pins 210 and lower insulating pins 212 which are received by recesses 211 of the inductor sectors. It is appreciated that various modifications may be made in the inductor sectors and their method of assembly without departing from the intended spirit and scope of this particular aspect of the invention.

INDUCTOR COOLANT SYSTEM

To prevent overheating of the inductor and the power leads, a coolant system is provided which causes a coolant, such as water, to flow through the various elements making up the inductors. Essentially, a series of coolant systems are employed; however, before discussing these systems, the coolant paths through each pair of inductor sectors will be described. Referring to the inductor sector pair E best shown in FIGURES 9, 11 and 12, each sector pair includes an upper horizontal passage 230 in one sector 194. This passage communicates with a first or inlet nose passage 232 extending along the nose and terminating in a lower horizontal passage 234. As shown in FIGURE 12, an inner connecting passage 236 in portion 206 forms a communication between passage 234 and a lower horizonal passage 238 of the second sector in the sector pair. Passage 238 terminates in a second or outlet nose passage 240 extending along the nose of the second gear sector. This passage 240 is communicated with an upper horizontal passage 242. These various passages form a continuous coolant path through each pair of gear sectors. The gear sector pair E has the outlet passage 242 communicated with the internal passage of connector 224. Each of the gear sector pairs includes this same coolant system and the arrangement of these coolant systems is illustrated in FIGURE 13. Nose passage 232 indicates the inlet sector of the sector pair, and passage 240 indicates the outlet sector of the sector pair.

Referring now more particularly to the inductor C for heating three alternate gear teeth 14, three separate coolant systems are employed. A coolant inlet 250, shown in FIGURE 1, is communicated with a conduit 252 extending along the lead 174. A transfer passage 254 in block 178 communicates the conduit 252 with an internal passage 256 within the secondary power lead 180. As shown in FIGURE 11, coolant flows from the internal passage 256 into the first pair of gear sectors. After flowing through the sectors, the coolant flows out the conduits 258.

Referring now to the second coolant system in inductor C, an inlet 260, shown in FIGURE 1, directs coolant to an internal passage 262 of secondary lead 182, in a manner similar to the first-mentioned coolant system. Coolant then flows through the second pair of inductor sectors and out conduit 264. The third coolant system includes an inlet conduit 270 which directs a coolant through the third pair of inductor sectors and out conduit 264. A partition 272 within connector 220 separates the conduits 258, 270. Of course, the conduits 258, 267 and 270 are insulated tubing which does not affect the electrical characteristics of the inductor C.

Referring now to inductor D, an inlet 280 shown in FIGURE 2, introduces coolant into internal passage 282 of power lead 184, in a manner previously described. Thereafter, the coolant passes through the fourth pair of gear sectors and exits at outlet conduit 284. In a similar manner, coolant is introduced into passage 286 of lead 186 where it flows through the fifth pair of gear sectors and out the same conduit 284. It is appreciated that other coolant systems could be provided to cool the inductors C, D of apparatus A.

QUENCHING SYSTEM

After the alternate teeth marked H in FIGURE 11 have been heated, they are then quenched hardened by introducing a quenching fluid, such as water or oil thereagainst. The system in apparatus A for accomplishing this purpose is best shown in FIGURES 8 and 13. A large inlet conduit 300 is communicated with angularly disposed passages 302, 304. These passages direct the quenching fluid into a relatively large plenum chamber 306 within block 192. A plurality of orifices 308 direct the quenching fluid from the plenum chamber 306 between the inductor sectors of each sector pair. This is clearly shown in FIGURE 13 wherein the previously heated teeth, or the spaces occupied thereby, are marked Q to indicate that they are subsequently quenched by the system described above. As seen in FIGURE 8, a plurality of orifices 308 are provided between the sectors of a sector pair with the orifices being diverging to provide an even quenching pattern over the complete length of the previously heated teeth.

AIR SYSTEM

The alternate teeth between the pairs of gear sectors are not heated when the inductors C, D are energized. To assure this, the Carbonel E inserts 204 are used to shield these teeth. To further assist in this function, apparatus A is provided with a system for blowing air against the teeth not being heated during the heating operation. Two separate air systems are employed. The first, or upper air system, is best shown in FIGURES 8 and 13, and it includes an upper inlet 310 directly communicated with passage 312. This passage directs air into an upper plenum chamber 314. From here, air is forced through orifices 316 against the teeth which are not being heated. In a like manner, a lower air blowing system is provided. This system is best shown in FIGURES 8, 12 and 13, and it includes an inlet 320 communicated directly with a passage 322. This passage introduces air into a plenum chamber 324 from which it is forced through orifices 326 against a lower portion of the alternate teeth not being heated. The air against the upper and lower portions of the teeth not being heated assist in preventing annealing of these teeth if they have previously been hardened. This function will be explained in more detail later.

HEATING UNIT MOVING MECHANISM

The mechanism 30 for moving the heating units 26, 28 vertically with repect to gear B is best illustrated in FIGURES 1 and 2. The downwardly extending mounting plate 330 is coupled onto the support plate 170 for the heating units. Fixedly secured onto plate 330 are ways 332 which coact with ways 334 on frame 20 to allow vertical movement of the plate 170, and thus the heating units. Connected onto plate 330 are switch actuators 340, 342 and 344. When the plate 330 is moved downwardly, the actuator 340 closes a limit switch LS3. As the plate 330 is moved upwardly, actuator 344 closes limit switch LS10, and then the actuator 342 closes the limit switch LS4. The functions of these limit switches will be described later when the operation of apparatus A is explained in detail. A shroud or cover 350 is secured onto plate 170 and encloses a fluid actuating motor 360. This motor includes inlets 362, 364 and a cylinder 366. The cylinder is pivotally connected onto a mounting bracket 368 secured by appropriate means onto the frame 20. Also, motor 360 includes a reciprocal piston rod 370 coupled by a plate 372 onto the plate 170 of the heating units 26, 28. As the rod 370 is extended, the heating units are moved upwardly from their operative position with respect to gear B. Conversely, when the rod 370 is retracted, the heating units 26, 28 are moved downwardly into their heating positions.

LOCATOR ASSEMBLY

Figure 3:
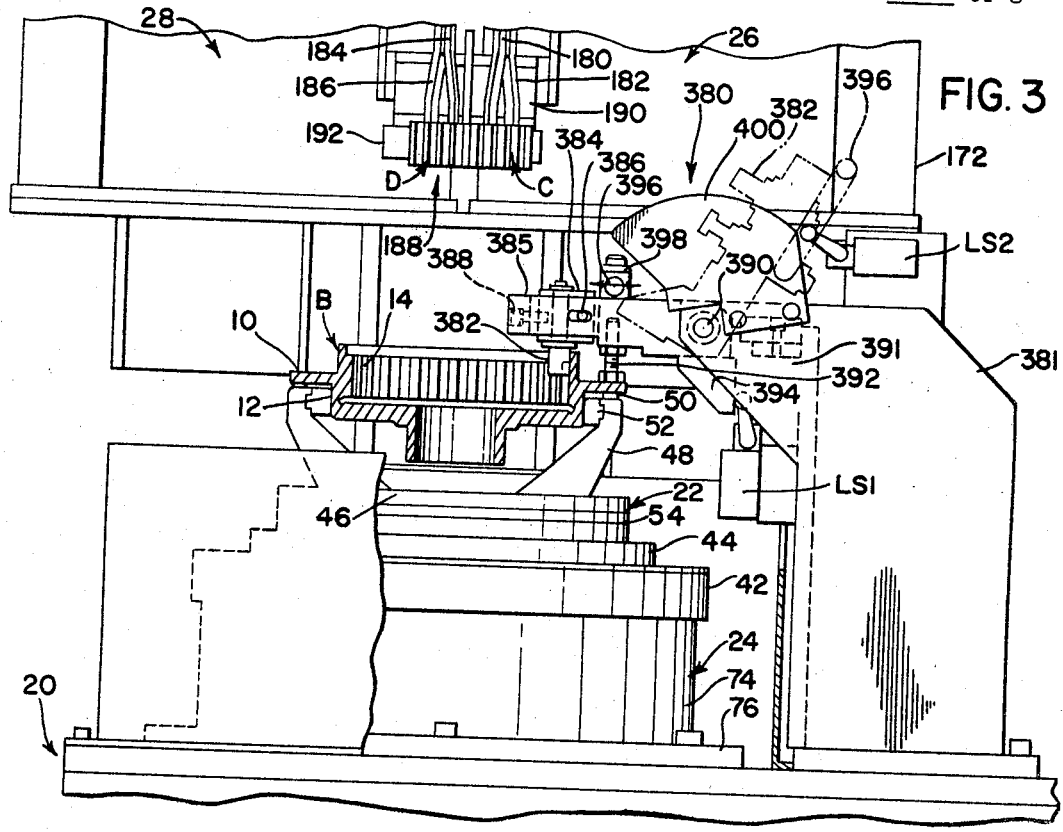
FIGURE 3 is an enlarged, partial side elevational view illustrating in more detail one aspect of the prefered embodiment.

Referring now to FIGURES 2 and 3, the apparatus A is provided with a locator assembly 380 supported by a frame 381. The locator assembly includes a downwardly extending head 382 having a contoured nose adapted to be received between two adjacent gear teeth 14 of gear B. The head 382 is supported on a block 384 movable with respect to a pivoted support block 385 by means of oppositely extending pins 386, only one of which is shown in FIGURE 3. To adjust the head 382, there is provided an adjusting bolt 388. Block 385 is pivoted about trunnion 390 supported by spaced arms 391. A stop bolt 394 below block 385 is used to control the downwardmost position of head 382. Depending from the blocks 385 is a switch plate 394 which actuates switch LS1 when a locator is in the down position, shown in full lines in FIGURE 3. To pivot the block 385, there is provided a handle 396 pivotally mounted on a stand 398. A cam plate 400 coacts with handle 396 to hold the block 384 in the upward position, shown in phantom lines in FIGURE 3. When the block 385 is pivoted into the "up" position, the handle 396 is first moved to the left to clear the cam plate 400 and then pulled around the cam plate into the position shown in phantom lines in FIGURE 3. In this position, the limit switch LS2 is actuated. Consequently, in the "down" position limit switch LS1 is actuated by the locator 380, and in the "up" position limit switch LS2 is actued by the locator assembly. The purpose of these switches will be described later.

STEPPING SWITCH

Referring now to FIGURE 15, there is schematically represented a stepping switch 410 which can be used to control the operation of apparatus A. In accordance with this illustrated embodiment, the stepping switch includes a motor 412 having an output shaft 414. A stepping circuit 416 includes contacts 418 controlled by solenoid 420. When the solenoid is closed, the stepping switch moves to its next position. The solenoid is, in turn, controlled by contacts 422 which are operated by limit switch LS4. Motor 412 also includes a reset mechanism 424 which brings the motor to the first operating position when energized. Heating unit 26 is controlled by a mechanism designated 430. This mechanism includes contacts 432 which are closed by a cam follower 434. A switch plate 436 is fixedly secured to rotate with shaft 414. This plate includes a peripheral cam 438 which extends between positions 1 and 9 of the stepping switch 410. In other words, the first heating unit 26 is conditioned to be energized only when the stepping switch is in a position between 1–9. Thereafter, the first heating unit 26 is conditioned to not be energized.

The second heating unit 28 is controlled by a mechanism designated 440. This mechanism includes contacts 442 which are open and closed by a cam follower 444. A second switch plate 446 includes a peripheral cam 448 which extends between positions 1–10. The second heating unit, which heats two alternate gear teeth, is conditioned to be energized when the stepping switch 410 is in position 1–10. In other words, the second heating unit 28 is conditioned to be "on" in the 10th position of the stepping switch, while the second heating unit is conditioned to be "off." A reset relay 440 is controlled by a contact 452. When the cam follower 44 drops off of cam 448, contact 452 is closed and reset relay 450 is energized. Reset 450 actuates mechanism 424 through a line 454, shown as a dashed line. The function of this stepping switch will be explained in connection with the overall operation of apparatus A.

OPERATION

The various structures explained above and their cooperative functions will be appreciated from the following description of the operation of apparatus A.

Referring to FIGURE 4, pressure is applied behind piston 58. This spreads support arm 48. Gear B is then placed into the spread arms and the locator 380 is moved into the downward position, shown in FIGURE 3. The head 382 is forced between two adjacent teeth 14 on the gear B. This aligns the gear for subsequent processing. When the locator is moved downwardly, plate 394 closes switch LS1. This causes pressure to be relieved from chamber 56, and the arms 48 grip the gear B so that it is located with respect to the spindle 66. Thereafter, the locator 380 is moved upwardly. This trips limit switch LS2, as shown in FIGURE 3. This limit switch then causes motor 360 to lower the heating units 26, 28. When the heating units are lowered, acutator 340 trips limit switch LS3, as shown in FIGURE 1, and the heating units 26, 28 are energized. Both heating units are energized since the stepping switch is in position No. 1, and contacts 432, 442, shown in FIGURE 15, are closed. The inductors C, D are in the position shown in FIGURE 6 with the noses 202 of each inductor sector 194 being between adjacent gear teeth 14. As previously explained, every other gear tooth is heated by current flow as shown in FIGURE 14. After a preset time, the heating units are turned "off" and quenching fluid is directed through orifices 308. This quench hardens the previously heated teeth. Thereafter, the quenching fluid is turned "off" and the inductors are raised by motor 360. This moves the plate 330 upwardly so that actuator 344 trips limit switch LS10. Thereafter, the actuator 342 trips limit switch LS4. LS4 steps the stepping switch 410 into the next position, i.e. position No. 2. In this position, both the heating units 26, 28 are conditioned to be turned "on" again.

Reverting now back to the operation of limit switch LS10. This switch causes shift rod 100 to be moved downwardly by cylinder 102. The pins 136 of second clutch member 124 register with holes 120 of first clutch member 116. This engages the clutch members so that there is a direct drive between pinion 134 and pinion 92. When the shift rod 100 is moved to its downwardmost position, limit switch LS5, shown in FIGURE 1, is tripped. Cylinder 160 then retracts the indexing rod 140 to the right, shown in FIGURE 5. This rotates pinion 134 and pinion 92. In this manner, the gear B is rotated a preselected distance determined by the inwardmost position of rod 140 and the amount of retracting movement. This position is adjusted by stop 150 at one end of the rod 140 and stop 458 at the opposite end. When the rod 140 has been retracted by cylinder 160, switch plate 166 trips switch LS6, shown in FIGURE 2. This causes shift rod 100 to be moved upwardly. This disengages the clutch members 116, 124. When the shift rod 100 is in its upwardmost position, pin 460 moves into locating hole 462 to lock plate 40 into another position. Of course, there are a number of holes 462 spaced circumferentially around the plate 40. The plate 40 is rotated, in this embodiment, a distance corresponding to ten teeth so that the inductors heat the next adjacent group of five alternate teeth.

When the rod 100 is in the upwardmost position, limit switch LS7 is tripped. This causes the indexing rod 140 to be moved forward against stop 150 so that it is conditioned for a subsequent indexing of the gear B. The forward movement of rod 140 causes plate 166 to trip limit switch LS8. This limit switch causes the inductors to again be lowered, and the cycle is repeated until ten operations of the cycle have been completed. On the tenth index, only inductor D is energized since only two teeth need be hardened during the last cycle. This will be explained later.

When the tenth cycle is completed, the reset relay 450 is energized which discontinues the operation of apparatus A and returns the stepping switch to position 1. At this time, the gear is released and may be removed. It is appreciated that various hydraulic and electrical circuits have been eliminated from this disclosure for the purposes of simplicity. Various electrical and hydraulic circuits could be adapted for use with apparatus A by a person with ordinary skill in this particular art.

Referring now to FIGURE 10, a particular gear B is illustrated. This gear has 47 separate teeth. In the first position of the stepping switch, the teeth labeled A (teeth 1, 3, 5, 7 and 9) are hardened. In the second position, the teeth labeled B are hardened. Each time the gear B is indexed in the direction of the arrow in FIGURE 10 ten different teeth are brought into operating position with respect to the inductors C, D. This hardening of alternate teeth is repeated in accordance with the letters above the various numbered teeth. The inductors C and D remain stationary with respect to the gear B, and the teeth hardened by inductor C are marked Y, while the teeth hardened by inductor D are marked X. As the hardening operation progresses from one group of teeth to another the ninth position of the gear hardens the teeth designated I. Thereafter, only teeth 44 and 46 have not been hardened. The stepping switch has progressed through nine separate steps and has hardened 45 teeth. As the gear is indexed to the tenth position, the inductor C is turned "off." Consequently, the inductor D hardens teeth 44 and 46 to complete the hardening of all teeth around the periphery of gear B. It is appreciated that as the number of teeth of a gear varies, the number of indexes may vary and the particular heating station turned "off" may be different. In addition, the inductors may heat a different number of teeth when desired. By heating only alternate teeth at one time, warpage and distortion of the gear is reduced. In addition, the apparatus A hardens a number of teeth at one time. This substantially reduces the overall cycle time for inductively heating and then quenching the individual teeth around the periphery of the gear B.

The present invention has been described in connection with one limited embodiment of the invention; however, various changes may be made in this embodiment without departing from the intended spirit and scope of the present invention as defined in the appended claims.

Having thus described our invention, we claim:

1. An apparatus for hardening the spaced teeth of a gear, said teeth being arranged in a circle having a given circumference, said apparatus comprising:
   (a) an inductor means for simultaneously heating a selected number of alternate teeth in an arc sector extending along only a portion of said circumference;
   (b) a quenching unit associated with said inductor means for quenching said heated teeth;
   (c) means for indexing said gear to bring successive arc sectors along said circumference into alignment with said inductor means;
   (d) control means for causing said indexing means to index said gear a sufficient number of times and distances to heat and quench each of said teeth with said number of indexing times causing at least two revolutions of said gear with the alternate gears that are unhardened during the first revolution being hardened during a subsequent revolution;
   (e) means for causing relative movement between said inductor means and said gear in a direction axial of said gear before said gear is indexed to prevent interference between said teeth and inductor means; and,
   (f) means for moving said inductor means into operative position with respect to said teeth after said gear is indexed.

2. An apparatus as defined in claim 1 wherein said inductor means includes at least two independent inductors and means for selectively controlling said inductors to change the number of alternate teeth being heated in said arc sector by said inductor means.

3. An apparatus as defined in claim 1 wherein said control means indexes said gear equal arcuate distances each time.

4. An apparatus as defined in claim 1 wherein said control means indexes said gear to bring adjacent successive arc sectors into heating relationship with said inductor means.

5. An apparatus as defined in claim 1 wherein said inductor means includes at least two independent inductors, each inductor being capable of heating a different number of alternate teeth and means for selectively energizing said inductors to change the number of alternate teeth being heated by said inductor means.

6. An apparatus as defined in claim 1 wherein said arc sector is less than ¼ of said circumference.

7. An apparatus as defined in claim 1 wherein said inductor means includes at least two independent inductors with separate control means for each inductor.

8. An apparatus as defined in claim 7 including:
(g) means for deenergizing at least one of said inductors during a selected one of said index times.

9. An apparatus as defined in claim 8 wherein said selected one of said index times is the last index time whereby a fewer number of teeth are heated and quenched during the cycle following said last index.

References Cited

UNITED STATES PATENTS

| 2,426,053 | 8/1947 | Roberds | 148—147 X |
| 2,857,154 | 10/1958 | Jones | 266—4 |
| 3,026,101 | 3/1962 | Pethybridge | 266—4 |
| 3,122,625 | 2/1964 | Lenz | 266—4 X |
| 3,193,269 | 7/1965 | Hammon | 148—147 X |

FOREIGN PATENTS 256,898   3/1949   Switzerland.

J. SPENCER OVERHOLSER, *Primary Examiner.*

R. SPENCER ANNEAR, *Assistant Examiner.*

U.S. Cl. X.R.

148—147, 149, 150